United States Patent
Elshrif et al.

(10) Patent No.: US 12,084,205 B2
(45) Date of Patent: Sep. 10, 2024

(54) METHODS AND SYSTEMS FOR IDENTIFYING AIRCRAFT FAULTS

(71) Applicants: Qatar Foundation for Education, Science and Community Development, Doha (QA); The Boeing Company, Chicago, IL (US)

(72) Inventors: Mohamed M. Elshrif, Doha (QA); Sanjay Chawla, Doha (QA); Franz D. Betz, Seattle, WA (US); Dragos D. Margineantu, Bellevue, WA (US)

(73) Assignees: Qatar Foundation for Education, Science and Community Development, Doha (QA); The Boeing Company, Chicago, IL (US)

( * ) Notice: Subject to any disclaimer, the term of this patent is extended or adjusted under 35 U.S.C. 154(b) by 718 days.

(21) Appl. No.: 16/898,483

(22) Filed: Jun. 11, 2020

(65) Prior Publication Data
US 2020/0391885 A1    Dec. 17, 2020

Related U.S. Application Data

(60) Provisional application No. 62/859,791, filed on Jun. 11, 2019.

(51) Int. Cl.
*B64F 5/60*   (2017.01)
*B64F 5/40*   (2017.01)
*B64D 45/00*  (2006.01)

(52) U.S. Cl.
CPC .......... *B64F 5/60* (2017.01); *B64F 5/40* (2017.01); *B64D 2045/0085* (2013.01)

(58) Field of Classification Search
CPC ....... B64F 5/60; B64F 5/40; B64D 2045/0085
See application file for complete search history.

(56) References Cited

U.S. PATENT DOCUMENTS

| | | | | |
|---|---|---|---|---|
| 2009/0315890 | A1* | 12/2009 | Modani | G06Q 10/10 345/440 |
| 2012/0110391 | A1* | 5/2012 | Bock | G06F 11/079 714/E11.178 |

(Continued)

OTHER PUBLICATIONS

T. Mikolov, K. Chen, G. Corrado, and J. Dean, "Efficient Estimation of Word Representations in Vector Space," CoRR, vol. abs/1301. 3781, 2013. [Online]. Available: http://arxiv.org/abs/1301.3781.

(Continued)

*Primary Examiner* — Kyle R Quigley
(74) *Attorney, Agent, or Firm* — Cooper Legal Group LLC

(57) ABSTRACT

A method for identifying aircraft faults, comprising: receiving aircraft health dataset comprising plurality of maintenance identifiers which each identify aircraft fault; storing diagnostics database storing plurality of part identifiers which each identify part of aircraft which is possible cause of generation of at least one maintenance identifier; generating graph of plurality of maintenance identifiers and plurality of edges in which maintenance identifiers are connected to one another by edge if maintenance identifiers are identified by common part identifier in diagnostics database; extracting clique from graph, clique comprising plurality of maintenance identifiers and respective plurality of edges of graph; determining intersection between at least two edges of clique; identifying candidate part identifier which is common to intersecting edges of clique, candidate part identifier identifying part of aircraft which is possible cause of generation of at least some of maintenance identifiers of clique; and outputting candidate part identifier.

17 Claims, 8 Drawing Sheets

(56) References Cited

U.S. PATENT DOCUMENTS

| | | | |
|---|---|---|---|
| 2013/0274991 A1* | 10/2013 | Cheriere | G06F 11/0739 701/32.9 |
| 2017/0288990 A1* | 10/2017 | Atasu | G06F 16/9024 |
| 2019/0130294 A1* | 5/2019 | Volponi | G01D 5/00 |
| 2021/0174612 A1* | 6/2021 | Wilmering | G05B 23/024 |

OTHER PUBLICATIONS

T. Mikolov, I. Sutskever, K. Chen, G. Corrado, and J. Dean, "Distributed Representations of Words and Phrases and their Compositionality," CoRR, vol. abs/1310.4546, 2013. [Online]. Available: http://arxiv.org/abs/1310.4546.

Y. Goldberg and O. Levy, "word2vec Explained: Deriving Mikolov et al.'s Negative-Sampling Word-Embedding Method," CoRR, vol. abs/1402.3722, 2014. [Online], Available: http://arxiv.org/abs/1402.3722.

C. Dyer, "Notes on Noise Contrastive Estimation and Negative Sampling," CoRR, vol. abs/1410.8251, 2014. [Online]. Available: http://arxiv.org/abs/1410.8251.

A. Mnih and Y. W. Teh, "A Fast and Simple Algorithm for Training Neural Probabilistic Language Models," in ICML, 2012.

A. Mnih and K. Kavukcuoglu, "Learning Word Embeddings Efficiently with Noise-Contrastive Estimation," in Advances in Neural Information Processing Systems 26, C. J. C. Burges, L. Bottou, M. Welling, Z. Ghahramani, and K. Q. Weinberger, Eds. Curran Associates, Inc., 2013, pp. 2265-2273. [Online]. Available: http://papers.nips.cc/paper/5165-learning-word-embeddings-efficiently-with-noise-contrastive-estimation.pdf.

X. Rong, "word2vec Parameter Learning Explained," CoRR, vol. abs/1411.2738, 2014. [Online]. Available: http://arxiv.org/abs/1411.2738.

E. Asgari and M. R. K. Mofrad, "Continuous Distributed Representation of Biological Sequences for Deep Proteomics and Genomics," PLOS One, vol. 10, No. 11, pp. 1-15, 11 2015. [Online], Available: http://dx.doi.org/10.1371%2Fjournal.pone.0141287.

V. Cheriere, "Aircraft Preventive Diagnosis Based on Failure Condition Graphs," in Proceedings of the Second European Conference of the Prognostics and Health Management Society, 2014.

K. L. Tsui, N. Chen, Q. Zhou, Y. Hai, and W. Wang, "Prognostics and Health Management: A Review on Data Driven Approaches," Mathematical Problems in Engineering, vol. 10.1155/2015/793161, 2015. [Online]. Available: http://dx.doi.org/10.1155/2015/793161.

G. W. Vogl, B. A. Weiss, and M. Helu, "A Review of Diagnostic and Prognostic Capabilities and Best Practices for Manufacturing," Journal of Intelligent Manufacturing, Jun. 2016. [Online]. Available: https://doi.org/10.1007/s10845-016-1228-8.

* cited by examiner

| MMSG code | MMSG description |
|---|---|
| 22-13391 | Autopilot Flight Director Computer |
| 28-20012 | Tank Unit (Center Left No.2) |
| 28-20050 | Fuel Quantity Processor |
| 36-10250 | Press Regulating and SOV |

Figure 1

Algorithm 1 TRACER FRAMEWORK FOR PART FAILURE DETECTION WITH BRON-KERBOSCH ALGORITHM 1: Bron_Kerbosch(R,P,X)
2: {
3: /* R: possibly a clique */
4: /* P : Holds vertices adjacent to every vertex currently in R, when added to R makes it maximal */
5: /* X: contains nodes already in some clique or processed (removes the duplicates) */
6:   if If P and X are both empty then
7:     report R as a maximal clique
8:   for each vertex v in P do
9:     Bron_Kerbosch (R $\cup$ {v}, P $\cap$ Nbr(v), X $\cap$ Nbr(v))
10:     P := P \ {v}
11:     X := X $\cup$ {v}
12:   end for
13: end if
14: }

Figure 2

| MMSGs | possible causes (parts failure) |
|---|---|
| $m_1$ | $p_2, p_5, p_8, p_{10}$ |
| $m_2$ | $p_4, p_5, p_8$ |
| $m_3$ | $p_1, p_4, p_{10}$ |
| $m_4$ | $p_2, p_8$ |

Figure 4

| Clique #1 | | |
|---|---|---|
| Node # from the graph | Represented MMSG | Related PCs |
| 2 | 22-23011 | 3719 |
| 3 | 22-23024 | 3719 |
| 4 | 22-29310 | 3719 |
| 5 | 22-29320 | 3719 |
| 6 | 22-29330 | 3719 |
| 7 | 22-29340 | 3719 |
| 8 | 23-08893 | 3719 |
| 24 | 26-31132 | 3719 |
| 25 | 27-10804 | 3719 |
| 26 | 27-10805 | 3719 |
| 52 | 31-83083 | 3719 |
| 53 | 31-83093 | 3719 |
| 54 | 31-83103 | 3719 |
| 55 | 31-83153 | 3719 |
| 56 | 31-83163 | 3719 |
| 72 | 45-15537 | 3719 |

Figure 8

METHODS AND SYSTEMS FOR IDENTIFYING AIRCRAFT FAULTS

CROSS-REFERENCE TO RELATED APPLICATIONS

The present application is a non-provisional filing of and claims priority to U.S. Provisional Patent Application 62/859,791, titled "Methods and systems for identifying aircraft faults" and filed on Jun. 11, 2019, which is incorporated herein by reference.

FIELD

The present invention relates to methods and systems for identifying aircraft faults. More particularly, the present invention relates to identifying the root cause of aircraft faults using monochromatic clique detection.

BACKGROUND

A modern aircraft incorporates complex systems and a large amount of with equipment. Each piece of equipment, otherwise known as a 'part', is tracked by sensors to monitor its health condition. The observed activity of each piece of equipment is recorded in an event log. The event log provides an excellent resource for the health condition of each part during a flight leg. However, using the event log to try to find the cause of aircraft generated maintenance messages (MMSGs) typically indicates that there are many possible causes (PC) associated with each maintenance message (MMSG).

Traditionally, when a MMSG is generated, maintenance crew or technicians work through a fault isolation manual (FIM) to troubleshoot the problem, i.e. clearing the generated MMSGs. A technician must follow certain steps in the same order as indicated in the FIM booklet, which involve many actions, such as replacing a part and checking wires, etc. If, after fixing or replacing a specific part, a MMSG still appears in the monitoring system, the technician then attempts to fix or replace the next part in the list of possible causes for a specific MMSG. This procedure is continued until the faulty part or equipment is replaced and the monitoring system indicates that the equipment functions are returned back to operating normally. At the end of this procedure, a technician documents work that was carried out in a post flight report, known as a PRITA file.

It is known that the maintenance process followed in a FIM may not lead immediately to a root-cause identification of a fault. This is especially "true" in the case of maintenance messages (MMSGs), also referred to herein as maintenance identifiers. In fact, the information in an aircraft's Loadable Diagnostic Information (LDI) file suggests that, for each MMSG, several physical parts have to be examined and potentially replaced. Analysis of a completed PRITA file also suggests that, for a significant number of cases, replacing a part may not prevent the purported MMSG from being triggered.

Existing solutions are based mainly on following the Fault Isolation Manual (FIM) and decisions taken by an experienced ground engineer on which possible physical part is the most likely cause of the fault message. This process is time consuming and it is open to human error since the process relies on the implicit knowledge of the ground engineer.

There is a need for improved methods and systems for identifying aircraft faults.

SUMMARY

According to one aspect, there is provided a method for identifying aircraft faults, the method comprising: receiving, at a processing arrangement which incorporates a processor and a memory, an aircraft health dataset comprising a plurality of maintenance identifiers, each maintenance identifier of the plurality of maintenance identifiers identifying an aircraft fault; storing, at the processing arrangement, a diagnostics database storing a plurality of part identifiers, each part identifier of the plurality of part identifiers identifying a part of an aircraft which is a possible cause of the generation of at least one maintenance identifier; generating, by the processing arrangement, a graph of the plurality of maintenance identifiers and a plurality of edges in which maintenance identifiers are connected to one another by an edge of the plurality of edges if the maintenance identifiers are identified by a common part identifier in the diagnostics database; extracting, by the processing arrangement, a clique from the graph, the clique comprising a plurality of the maintenance identifiers and a respective plurality of edges of the graph; determining, by the processing arrangement, an intersection between at least two edges of the clique; identifying, by the processing arrangement, a candidate part identifier which is common to the intersecting edges of the clique, the candidate part identifier identifying a part of the aircraft which is a possible cause of the generation of at least some of the maintenance identifiers of the clique; and outputting, from the processing arrangement, the candidate part identifier to enable a user to perform a maintenance task on the part of the aircraft which is identified by the candidate part identifier.

In some embodiments, extracting a clique from the graph comprises: enumerating a maximal clique in the graph.

In some embodiments, enumerating a maximal clique in the graph comprises performing, by the processing arrangement, a Bron-Kerbosch algorithm.

In some embodiments, the method further comprises: extracting, by the processing arrangement, a monochromatic maximum clique in the graph.

In some embodiments, the method further comprises: extracting, by the processing arrangement, a further clique from the graph, the further clique comprising a further plurality of the maintenance identifiers and a respective further plurality of edges of the graph; determining, by the processing arrangement, an intersection between at least two edges of the further clique; and identifying, by the processing arrangement, a further candidate part identifier which is common to the intersecting edges of the further clique, the further candidate part identifier identifying a further part of the aircraft which is a possible cause of the generation of at least some of the further maintenance identifiers of the further clique.

In some embodiments, extracting a further clique from the graph comprises: enumerating a further maximal clique in the graph.

In some embodiments, enumerating a further maximal clique in the graph comprises performing, by the processing arrangement, a Bron-Kerbosch algorithm.

In some embodiments, the method further comprises: extracting, by the processing arrangement, a further monochromatic maximum clique in the graph.

In some embodiments, the method further comprises: ranking, by the processing arrangement, the clique and the further clique by size.

In some embodiments, the method further comprises: ranking, by the processing arrangement, the clique and the further clique by monochromaticity.

In some embodiments, the method further comprises: performing a maintenance task on the part of the aircraft which is identified by the candidate part identifier.

In some embodiments, the method further comprises: receiving, at the processing arrangement, an updated aircraft health dataset; and checking, by the processing arrangement, whether any maintenance messages have been cleared in response to the maintenance task being performed.

According to another aspect, there is provided a system for identifying aircraft faults, the system comprising: a processor and a memory, the memory storing executable instructions which, when executed by the processor, cause the processor to: receive an aircraft health dataset comprising a plurality of maintenance identifiers, each maintenance identifier of the plurality of maintenance identifiers identifying an aircraft fault; store a diagnostics database storing a plurality of part identifiers, each part identifier of the plurality of part identifiers identifying a part of an aircraft which is a possible cause of the generation of at least one maintenance identifier; generate a graph of the plurality of maintenance identifiers and a plurality of edges in which maintenance identifiers are connected to one another by an edge of the plurality of edges if the maintenance identifiers are identified by a common part identifier in the diagnostics database; extract a clique from the graph, the clique comprising a plurality of the maintenance identifiers and a respective plurality of edges of the graph; determine an intersection between at least two edges of the clique; identify a candidate part identifier which is common to the intersecting edges of the clique, the candidate part identifier identifying a part of the aircraft which is a possible cause of the generation of at least some of the maintenance identifiers of the clique; and output the candidate part identifier to enable a user to perform a maintenance task on the part of the aircraft which is identified by the candidate part identifier.

In some embodiments, the memory stores executable instructions which, when executed by the processor, cause the processor to: extract the clique from the graph by enumerating a maximal clique in the graph.

In some embodiments, the memory stores executable instructions which, when executed by the processor, cause the processor to: perform a Bron-Kerbosch algorithm to extract the clique from the graph.

In some embodiments, the memory stores executable instructions which, when executed by the processor, cause the processor to: extract a monochromatic maximum clique in the graph.

In some embodiments, the memory stores executable instructions which, when executed by the processor, cause the processor to: extract a further clique from the graph, the further clique comprising a further plurality of the maintenance identifiers and a respective further plurality of edges of the graph; determine an intersection between at least two edges of the further clique; and identify a further candidate part identifier which is common to the intersecting edges of the further clique, the further candidate part identifier identifying a further part of the aircraft which is a possible cause of the generation of at least some of the further maintenance identifiers of the further clique.

In some embodiments, the memory stores executable instructions which, when executed by the processor, cause the processor to: extract a further monochromatic maximum clique in the graph.

In some embodiments, the memory stores executable instructions which, when executed by the processor, cause the processor to: rank the clique and the further clique by monochromaticity.

According to another aspect, there is provided a computer-readable medium storing executable instructions which, when executed by a processor, cause the processor to: receive an aircraft health dataset comprising a plurality of maintenance identifiers, each maintenance identifier of the plurality of maintenance identifiers identifying an aircraft fault; store a diagnostics database storing a plurality of part identifiers, each part identifier of the plurality of part identifiers identifying a part of an aircraft which is a possible cause of the generation of at least one maintenance identifier; generate a graph of the plurality of maintenance identifiers and a plurality of edges in which maintenance identifiers are connected to one another by an edge of the plurality of edges if the maintenance identifiers are identified by a common part identifier in the diagnostics database; extract a clique from the graph, the clique comprising a plurality of the maintenance identifiers and a respective plurality of edges of the graph; determine an intersection between at least two edges of the clique; identify a candidate part identifier which is common to the intersecting edges of the clique, the candidate part identifier identifying a part of the aircraft which is a possible cause of the generation of at least some of the maintenance identifiers of the clique; and output the candidate part identifier to enable a user to perform a maintenance task on the part of the aircraft which is identified by the candidate part identifier.

BRIEF DESCRIPTION OF THE DRAWINGS

So that the present invention may be more readily understood, embodiments of the present invention will now be described, by way of example, with reference to the accompanying drawings, in which:

FIG. 1 is a table showing example MMSG codes and descriptions,

FIG. 2 shows an algorithm for extracting cliques of some embodiments,

FIG. 4 is a table showing example MMSGs and associated possible causes,

FIG. 8 is a table showing example MMSGs and associated possible causes for the first clique identified in FIG. 7.

DETAILED DESCRIPTION

Figure 3:
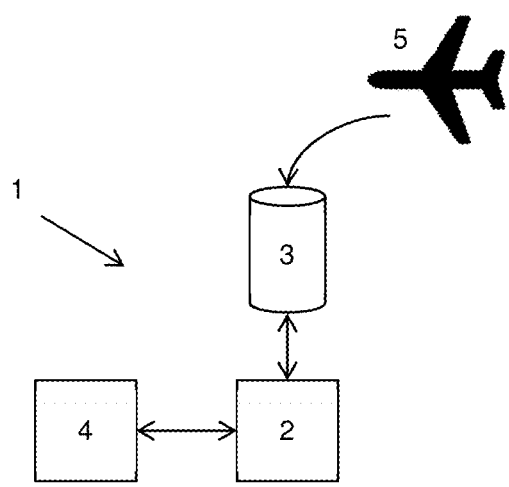
FIG. 3 is a schematic diagram of a system of some embodiments.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

The following disclosure provides many different embodiments, or examples, for implementing different features of the provided subject matter. Specific examples of components, concentrations, applications and arrangements are described below to simplify the present disclosure. These are, of course, merely examples and are not intended to be limiting. For example, the attachment of a first feature and a second feature in the description that follows may include embodiments in which the first feature and the second feature are attached in direct contact, and may also include embodiments in which additional features may be positioned between the first feature and the second feature, such that the first feature and the second feature may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The present disclosure proposes methods and systems based on network analysis of the combined flight leg airplane health management (AHM) logs and the LDI file to identify the root-cause of MMSGs with high precision, i.e., a root-cause is identified, there is a high probability that it is indeed the actual root-cause.

The method of some embodiments can be summarized as follows: generate a graph of nodes, where each node represents a maintenance message (MMSG) that appeared during a flight leg (or a series of flight legs) and connect two nodes if they share a common possible cause (part number) as listed in the Loadable Diagnostic Information (LDI) file. An edge is "colored" by the name of the part.

In some embodiments, the method will then extract all the cliques of the graph and rank the cliques by their size and monochromaticity. Thus, a large clique which is fully monochromatic indicates that the common part shared by the clique has potentially caused the appearance of all the maintenance messages, which form the clique. This approach has several advantages: (i) the appearance of a large monochromatic clique makes it unlikely that the common part (shared by the nodes) is by random chance and thus highly likely that must be an underlying cause, (ii) the graphs constructed for a flight leg (or a series of flight legs) will not be very large and thus it is relatively easy to identify the cliques, and (iii) cliques encode contextual information about fault messages and parts, which give a better understanding of how fault messages are correlated.

Some embodiments depend upon constructing an information graph about fault messages and parts. The construction depends upon the availability of fault message logs and the Loadable Diagnostic Information (LDI) file. In addition, the PRITA file, which represents the maintenance crew report, is considered as one way of validating the method.

An aircraft manufacturer or operator may use the methods and systems of some embodiments to prepare a more accurate Fault Isolation Manual (FIM).

Graph Theory Definitions

Definition 1 A clique (CL) in an undirected graph G=(V; E), where V is the set of vertices (nodes) and E is the set of edges, is a subset of vertices, where all its vertices are fully connected.

Definition 2 The Maximal Clique (MLCL) is a clique, which is not properly contained in any other clique.

Definition 3 The Maximum Clique (MXCL) is the maximum subgraph from the whole graph, where all its vertices are fully connected (it is a maximal clique with a maximum size).

Definition 4 The Monochromatic Clique (MCCL) is a subset of vertices, where all its vertices share the same edge.

Aviation Definitions

Definition 5 A maintenance message (MMSG) is a log entry generated by a sensor on-board an aircraft during a flight leg which provides information to an aircraft maintenance technician about any parts which are not operating correctly.

Definition 6 A possible cause (PC) represents a possible part failure that causes a MMSG to be generated by the monitoring system of an aircraft.

Definition 7 An airplane health management (AHM) log is a log event file, which contains all MMSGs records that were generated during each flight leg for every aircraft.

Definition 8 Fault Isolation Manual (FIM) is a document which prescribes an ordered series of steps to be followed by a technician, or ground engineer when troubleshooting a MMSG.

FIG. 1 of the accompanying drawings shows examples of typical MMSG codes along with their associates and descriptions.

Definition 9 A loadable diagnostic information (LDI) is an aircraft health database that was generated by technicians and ground engineers. An LDI specifies predetermined information concerning which equipment failure may be responsible for generating a MMSG. An LDI is frequently updated and it is considered as the 'ground truth' for building a graph.

Definition 10 A maintenance crew record (PRITA) is the post flight report written by a ground engineer, which explains the procedure followed in clearing each generated MMSG.

For every flight leg, an aircraft generates many maintenance messages (MMSGs) which are associated with different subsystems, or chapters, of the aircraft. An MMSG can be generated in any phase during the flight leg. It is necessary to detect fault conditions to prevent the avionics systems in the aircraft from operating with degraded or failed components and to meet aircraft safety requirements.

The method of some embodiments comprises at least some of the following:

1. For each flight leg window of an aircraft, construct a graph G(V,E), where the nodes of the graph represent the generated MMSGs.
2. Connect two nodes (MMSGs) by an edge, if they are associated with a common part failure (they share similar PC), which is obtained from the LDI database (historical data).
3. Enumerate all cliques during this period using an enumeration algorithm for finding maximal cliques in an undirected graph, such as a Bron-Kerbosch algorithm. FIG. 2 shows the pseudocode of a Bron-Kerbosch algorithm of some embodiments.
4. Extract all monochromatic cliques and organize them in descending order based on size.
5. For fault-diagnosis, the key point is that all nodes (MMSGs) in the monochromatic clique share the same part failure.

The method of some embodiments can be used for predictive maintenance: For a flight leg, find the largest monochromatic cliques. Be prepared to replace the 'common' part failure in the subsequent flight legs.

In order to validate the method, a technician can perform a maintenance task to resolve the common PC and then check if each MMSG appearing in the clique is cleared/resolved in a subsequent flight leg.

In some embodiments, the method comprises checking in the PRITA database, if the failed part was fixed, or replaced by ground engineers in the past.

The following description explains the method of some embodiments for extracting cliques using the Bron-Kerbosch algorithm shown in FIG. 2.

Initially, both P and X are empty sets (0) and R contains all vertices of the graph. Recursively, at each step, P holds the temporarily result, R holds all possible candidate sets, and X contains the excluded sets. Nbr{v} indicates the neighboring vertices to vertex v. The procedure of algorithm of FIG. 2 can be summarized as follows:

Randomly, pick a vertex v from R.

Add the vertex v to P and simultaneously remove all non-neighboring vertices from both R and X.

Recursively, randomly choose another vertex from the updated R until R becomes an empty set (φ).

Check if X is an empty set (φ):

Yes, report that the subset vertices in P constitutes maximal clique.

No, neglect these vertices. This means that the subset vertices in P is already taken clique.

Restore R, P, and X to the state before picking up the last vertex.

Remove this vertex from R and add it to X.

Expand to the next vertex.

if R becomes an empty set. Then, backtrack to the superior level.

Referring now to FIG. 3 of the accompanying drawings, a system 1 of some embodiments incorporates a computing device or processing arrangement which comprises a processor 2 which is coupled for communication with a memory 3. The memory 3 is a computer-readable medium which stores executable instructions for execution by the processor 2.

In this embodiment, the system 1 comprises an input and output module 4 which is coupled for communication with the processor 2. The input and output module 4 is configured to receive data input by a user and/or to provide a data output to a user. In some embodiments, the input and output module 4 is an input and output arrangement of a computing system which is in the form of a computing device, such as a desktop computer, laptop, smartphone or tablet, which is configured to communicate with the processor 2 via a computer network.

The memory 3 is configured to receive an aircraft health dataset, also known as a Loadable Diagnostic Information (LDI) file or airplane health management (AHM) log, from an aircraft 5. The aircraft health dataset comprises a plurality of maintenance identifiers (MMSGs) which each identify an aircraft fault.

The memory 3 stores a diagnostics database storing a plurality of part identifiers, each part identifier of the plurality of part identifiers identifying a part of an aircraft which is a possible cause of the generation of at least one maintenance identifier. The diagnostics database is a predetermined database which is updated frequently. The system 1 generates a graph of the plurality of maintenance identifiers and a plurality of edges in which maintenance identifiers are connected to one another by an edge if the maintenance identifiers are identified by a common part identifier in the diagnostics database.

The system 1 extracts a clique from the graph. The clique comprises a plurality of the maintenance identifiers and a respective plurality of edges of the graph.

In some embodiments, the system 1 extracts a clique from the graph by enumerating a maximal clique in the graph, for instance using the Bron-Kerbosch algorithm, as described above. In some embodiments, the system 1 extracts a monochromatic maximum clique in the graph.

The system 1 then determines an intersection between at least two edges of the clique. The system 1 identifies a candidate part identifier which is common to the intersecting edges of the clique, the candidate part identifier identifying a part of the aircraft which is a possible cause of the generation of at least some of the maintenance identifiers of the clique. The system 1 then outputs the candidate part identifier to enable a user to perform a maintenance task on the part of the aircraft which is identified by the candidate part identifier.

In some embodiments, the system 1 extracts a further clique from the graph, the further clique comprising a further plurality of the maintenance identifiers and a respective further plurality of edges of the graph. The system 1 determines an intersection between at least two edges of the further clique and identifies a further candidate part identifier which is common to the intersecting edges of the further clique. The further candidate part identifier corresponds to a further part of the aircraft which is a possible cause of the generation of at least some of the further maintenance identifiers of the further clique.

In some embodiments, the system 1 ranks the cliques by size. In some embodiments, the system 1 ranks the cliques by monochromaticity.

In a method of some embodiments a maintenance task is performed on the part of the aircraft which is identified by the system 1 as a candidate part identifier. In some embodiments, the method comprises receiving an updated aircraft health dataset (e.g. after a subsequent flight leg) and checking if any maintenance messages have been cleared in response to the maintenance task being performed.

The method of operation of some embodiments will now be illustrated in the following examples.

Example 1

This example assumes that during a flight leg, there are four maintenance messages $\{m_1; m_2; m_3; m_4\}$. In addition, the example supposes that the associated parts failure for each MMSG is as indicated in FIG. 4, which is based on the LDI information (historical data). A graph with four nodes, which represent the MMSGs, is then constructed as shown in FIG. 5 with the nodes being connected by edges if they share common part failure.

Figure 5:
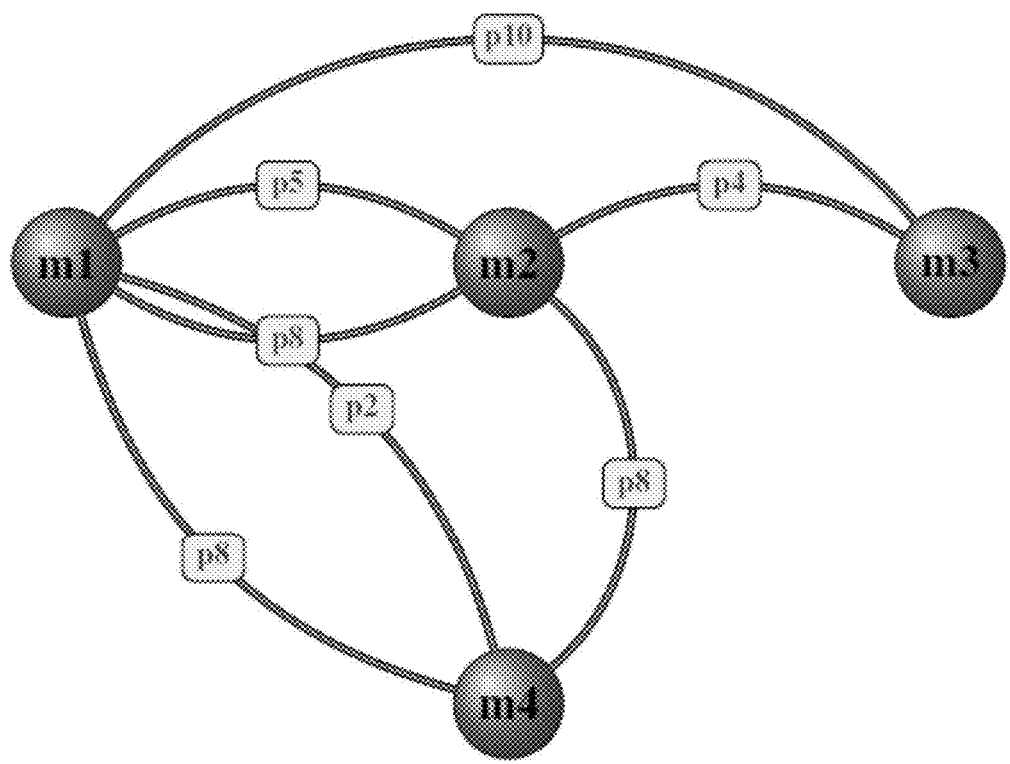
FIG. 5 is an example graph of MMSGs and connecting edges.

As shown in the graph in FIG. 5 there are two equally sized maximal cliques, which are $CL_1=\{m_1; m_2; m_3\}$ and $CL_2=\{m_1; m_2; m_4\}$. However, the key-point here is that for fault-detection, $CL_2$ is a more important clique because all three nodes share a common part failure, namely $p_8$. $CL_2$ is thus defined as a monochromatic clique.

Example 2

In this example, an aircraft health dataset (LDI file) was input into the system 1. The aircraft health dataset comprises all the recorded maintenance messages (MMSGs) over a period of one month.

The total number of MMSGs during this period is 484. However, many MMSGs were repeated and the total number of unique MMSGs during this period is 75.

Figure 6:
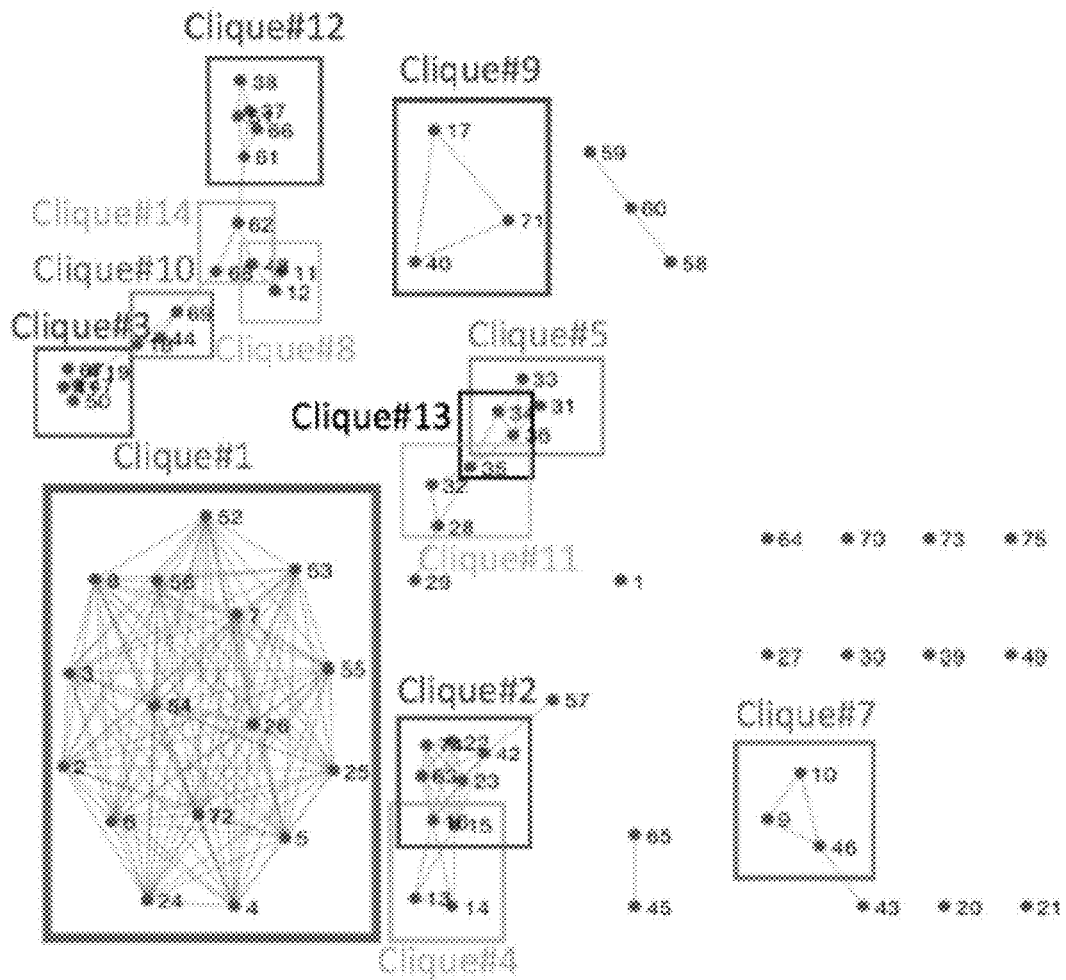
FIG. 6 is an example graph showing identified cliques.

The method constructs a graph, as described above. The graph is shown in FIG. 6 and comprises 75 nodes, which represents the total number of unique MMSGs. In this graph, each two nodes are connected by an edge if they share a common possible cause (PC), also named part number.

As shown in FIG. 6, the graph has many cliques on it. The method comprises extracting all cliques and identifying the common PC (part) on each one of them.

Figure 7:
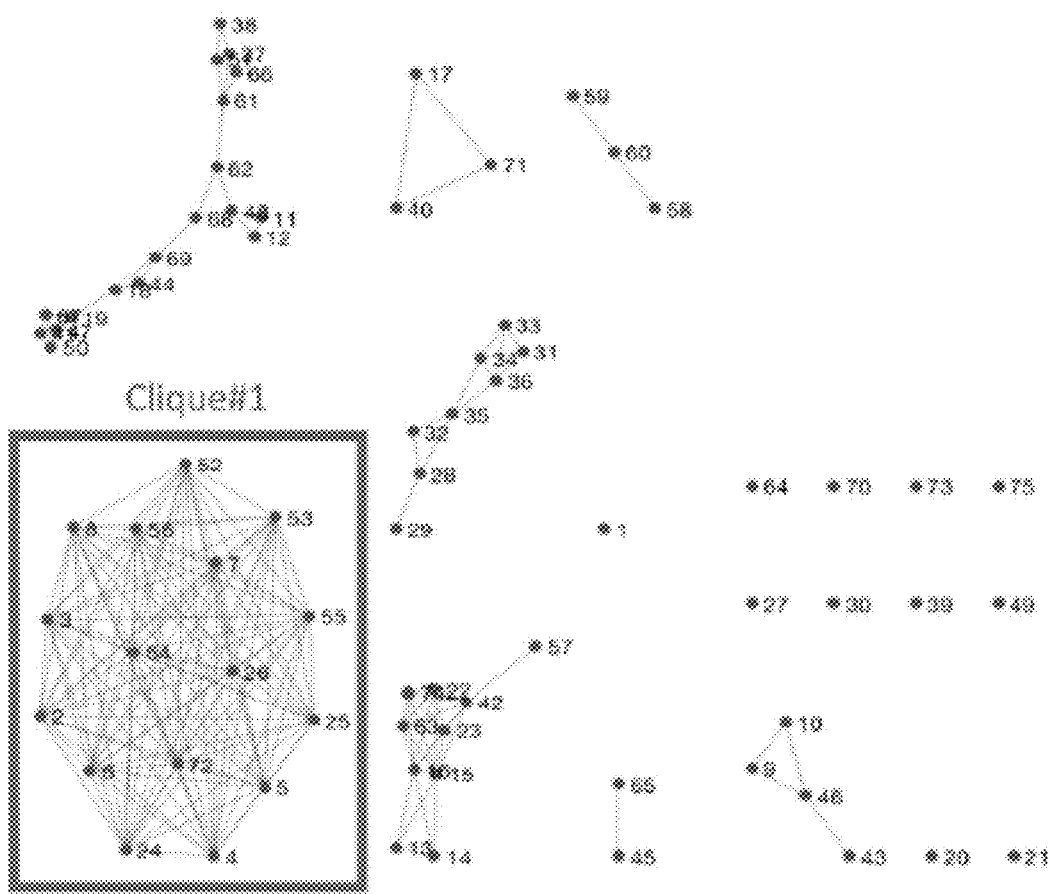
FIG. 7 is the example graph of FIG. 6 with a first clique identified.

The first clique is highlighted in FIG. 7. Performing the method on this first clique as described above reveals the possible cause as PC #3719, as shown in the table in FIG. 8.

In this example, the results in the table in FIG. 8 show that the extracted common part is across different chapters of the aircraft. In this first clique the involved chapters are automatic flight (22), communications (23), fire protection (26), flight controls (27), indicating and recording system (31), and control maintenance (45). The system 1 is therefore able to identify the aircraft fault easily across multiple different chapters of the aircraft.

The methods and systems of some embodiments reduce the operational time and increase the success rate in finding the actual part failure, or the correct possible cause (PC). The methods and systems of some embodiments may also be configured to predict a part failure automatically based on MMSGs.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described features (e.g., elements, resources, etc.), the terms used to describe such features are intended to correspond, unless otherwise indicated, to any features which performs the specified function of the described features (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

Embodiments of the subject matter and the functional operations described herein can be implemented in digital electronic circuitry, or in computer software, firmware, or hardware, including the structures disclosed in this specification and their structural equivalents, or in combinations of one or more of them.

Some embodiments are implemented using one or more modules of computer program instructions encoded on a computer-readable medium for execution by, or to control the operation of, a data processing apparatus. The computer-readable medium can be a manufactured product, such as hard drive in a computer system or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The terms "computing device" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks.

To provide for interaction with a user, some embodiments are implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of performing maintenance on an aircraft, the method comprising:
   receiving, at a processing arrangement which incorporates a processor and a memory, an aircraft health dataset comprising a plurality of maintenance identifiers, each maintenance identifier of the plurality of maintenance identifiers identifying an aircraft fault;
   storing, at the processing arrangement, a diagnostics database storing a plurality of part identifiers, each part identifier of the plurality of part identifiers identifying a part of the aircraft which is a possible cause of the generation of at least one maintenance identifier;
   generating, by the processing arrangement, a graph of the plurality of maintenance identifiers and a plurality of edges in which maintenance identifiers are connected to one another by an edge of the plurality of edges when the maintenance identifiers are identified by a common part identifier in the diagnostics database;
   extracting, by the processing arrangement, a clique from the graph by enumerating a maximal clique in the graph, the clique comprising a plurality of the maintenance identifiers and a respective plurality of edges of the graph;
   identifying, by the processing arrangement, a candidate part identifier which is common to at least two edges of the clique, the candidate part identifier identifying a part of the aircraft which is a possible cause of the generation of at least some of the maintenance identifiers of the clique;
   outputting, from the processing arrangement, the candidate part identifier; and
   performing a maintenance task on the aircraft by replacing or servicing the part of the aircraft which is identified by the candidate part identifier.

2. The method of claim 1, wherein enumerating a maximal clique in the graph comprises performing, by the processing arrangement, a Bron-Kerbosch algorithm.

3. The method of claim 2, wherein the method further comprises:
   extracting, by the processing arrangement, a monochromatic maximum clique in the graph.

4. The method of claim 1, wherein the method further comprises:
   extracting, by the processing arrangement, a further clique from the graph, the further clique comprising a further plurality of the maintenance identifiers and a respective further plurality of edges of the graph; and
   identifying, by the processing arrangement, a further candidate part identifier which is common to at least two edges of the further clique, the further candidate part identifier identifying a further part of the aircraft which is a possible cause of the generation of at least some of the further maintenance identifiers of the further clique.

5. The method of claim 4, wherein extracting a further clique from the graph comprises:
   enumerating a further maximal clique in the graph.

6. The method of claim 5, wherein enumerating a further maximal clique in the graph comprises performing, by the processing arrangement, a Bron-Kerbosch algorithm.

7. The method of claim 6, wherein the method further comprises:
   extracting, by the processing arrangement, a further monochromatic maximum clique in the graph.

8. The method of claim 7, wherein the method further comprises:
   ranking, by the processing arrangement, the clique and the further clique by size.

9. The method of claim 7, wherein the method further comprises:
   ranking, by the processing arrangement, the clique and the further clique by monochromaticity.

10. The method of claim 1, wherein the method further comprises:
    receiving, at the processing arrangement, an updated aircraft health dataset; and
    checking, by the processing arrangement, whether any maintenance messages have been cleared in response to the maintenance task being performed.

11. A system for performing maintenance on an aircraft comprising:
 a processor and a memory, the memory storing executable instructions which, when executed by the processor, cause the processor to:
  receive an aircraft health dataset comprising a plurality of maintenance identifiers, each maintenance identifier of the plurality of maintenance identifiers identifying an aircraft fault;
  store a diagnostics database storing a plurality of part identifiers, each part identifier of the plurality of part identifiers identifying a part of the aircraft which is a possible cause of the generation of at least one maintenance identifier;
  generate a graph of the plurality of maintenance identifiers and a plurality of edges in which maintenance identifiers are connected to one another by an edge of the plurality of edges when the maintenance identifiers are identified by a common part identifier in the diagnostics database;
  extract a clique from the graph by enumerating a maximal clique in the graph, the clique comprising a plurality of the maintenance identifiers and a respective plurality of edges of the graph;
  identify a candidate part identifier which is common to at least two edges of the clique, the candidate part identifier identifying a part of the aircraft which is a possible cause of the generation of at least some of the maintenance identifiers of the clique;
  output the candidate part identifier; and
  perform a maintenance task on the aircraft by replacing or servicing the part of the aircraft which is identified by the candidate part identifier.

12. The system of claim 11, wherein the memory stores executable instructions which, when executed by the processor, cause the processor to:
 perform a Bron-Kerbosch algorithm to extract the clique from the graph.

13. The system of claim 12, wherein the memory stores executable instructions which, when executed by the processor, cause the processor to:
 extract a monochromatic maximum clique in the graph.

14. The system of claim 11, wherein the memory stores executable instructions which, when executed by the processor, cause the processor to:
 extract a further clique from the graph, the further clique comprising a further plurality of the maintenance identifiers and a respective further plurality of edges of the graph; and
 identify a further candidate part identifier which is common to at least two edges of the further clique, the further candidate part identifier identifying a further part of the aircraft which is a possible cause of the generation of at least some of the further maintenance identifiers of the further clique.

15. The system of claim 14, wherein the memory stores executable instructions which, when executed by the processor, cause the processor to:
 extract a further monochromatic maximum clique in the graph.

16. The system of claim 15, wherein the memory stores executable instructions which, when executed by the processor, cause the processor to:
 rank the clique and the further clique by monochromaticity.

17. A non-transitory computer-readable medium storing executable instructions which, when executed by a processor, cause the processor to:
 receive an aircraft health dataset comprising a plurality of maintenance identifiers, each maintenance identifier of the plurality of maintenance identifiers identifying an aircraft fault;
 store a diagnostics database storing a plurality of part identifiers, each part identifier of the plurality of part identifiers identifying a part of an aircraft which is a possible cause of the generation of at least one maintenance identifier;
 generate a graph of the plurality of maintenance identifiers and a plurality of edges in which maintenance identifiers are connected to one another by an edge of the plurality of edges when the maintenance identifiers are identified by a common part identifier in the diagnostics database;
 extract a clique from the graph by enumerating a maximal clique in the graph, the clique comprising a plurality of the maintenance identifiers and a respective plurality of edges of the graph;
 identify a candidate part identifier which is common to at least two edges of the clique, the candidate part identifier identifying a part of the aircraft which is a possible cause of the generation of at least some of the maintenance identifiers of the clique;
 output the candidate part identifier; and
 perform a maintenance task on the aircraft by replacing or servicing the part of the aircraft which is identified by the candidate part identifier.

\* \* \* \* \*